United States Patent
Khlissa et al.

(10) Patent No.: US 12,512,710 B2
(45) Date of Patent: Dec. 30, 2025

(54) ROTATING ELECTRIC MACHINE FOR FULL-WAVE CONTROL AND WITH PULSE-WIDTH MODULATION AND ELECTRICAL ASSEMBLY

(71) Applicant: VALEO EQUIPEMENTS ELECTRIQUES MOTEUR, Creteil (FR)

(72) Inventors: Radhouane Khlissa, Creteil (FR); Jérome Legranger, Creteil (FR); Radu Fratila, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 230 days.

(21) Appl. No.: 18/256,868

(22) PCT Filed: Dec. 6, 2021

(86) PCT No.: PCT/EP2021/084401
§ 371 (c)(1),
(2) Date: Jun. 9, 2023

(87) PCT Pub. No.: WO2022/122653
PCT Pub. Date: Jun. 16, 2022

(65) Prior Publication Data
US 2024/0022127 A1      Jan. 18, 2024

(30) Foreign Application Priority Data
Dec. 10, 2020   (FR) ...................... 20 12984

(51) Int. Cl.
*H02K 1/276*   (2022.01)
*H02K 21/14*   (2006.01)

(52) U.S. Cl.
CPC ............ *H02K 1/276* (2013.01); *H02K 21/14* (2013.01)

(58) Field of Classification Search
CPC ...... H02K 1/165; H02K 1/276; H02K 1/2766; H02K 21/14; H02K 2201/03; H02K 2213/03
(Continued)

(56) References Cited

U.S. PATENT DOCUMENTS 6,462,429 B1* 10/2002 Dhyanchand ........... F02N 11/04
                                                              290/31
8,368,273 B2*  2/2013 Hino ...................... B60L 50/61
                                                            310/156.47
(Continued)

FOREIGN PATENT DOCUMENTS

DE    10 2018 112 971 A1    12/2019
EP         3 297 130 A1      3/2018
(Continued)

OTHER PUBLICATIONS

Japanese Office Action issued on Oct. 25, 2024 in Japanese Patent Application No. 2023-535582 (with unedited computer-generated English translation), 10 pages.

(Continued)

*Primary Examiner* — Alex W Mok
(74) *Attorney, Agent, or Firm* — Oblon, McClelland, Maier & Neustadt, L.L.P.

(57) ABSTRACT

A rotary electric machine includes a stator including a stator body and a winding, the winding passing through slots of the stator body, the slots having an isthmus. A rotor includes a rotor body with cavities and permanent magnets, arranged in the cavities, forming magnetic poles having a central axis, a quadrature axis being equidistant from two successive central axes. The ratio between the width of the isthmus and the (Continued)

width of the slot being greater than or equal to 0.40 and less than or equal to 0.7, and the ratio between an air gap at the central axis and an air gap at the quadrature axis being greater than or equal to 0.8 and less than or equal to 1.5. An electrical assembly includes such a rotary electric machine and an inverter.

20 Claims, 5 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 9,780,608 B2* | 10/2017 | Wu | H02P 6/182 |
| 9,925,889 B2* | 3/2018 | Hao | H02K 1/2766 |
| 10,622,875 B2* | 4/2020 | Fatemi | H02K 1/276 |
| 2013/0106228 A1* | 5/2013 | Aoyama | H02K 21/14 310/156.53 |
| 2013/0193783 A1* | 8/2013 | Aoyama | H02K 1/2766 310/51 |
| 2018/0358876 A1 | 12/2018 | Fatemi et al. | |
| 2019/0089214 A1* | 3/2019 | Tang | H02K 1/2766 |
| 2020/0266677 A1* | 8/2020 | Tago | H02K 1/165 |
| 2020/0336033 A1* | 10/2020 | Takahashi | H02P 21/22 |

FOREIGN PATENT DOCUMENTS

| | | |
|---|---|---|
| JP | 2017-184579 A | 10/2017 |
| JP | 2019-68577 A | 4/2019 |
| WO | WO 2019/081427 A1 | 5/2019 |

OTHER PUBLICATIONS

International Search Report issued Jan. 31, 2022 in PCT/EP2021/084401, filed on Dec. 6, 2021, 2 pages.

* cited by examiner

ROTATING ELECTRIC MACHINE FOR
FULL-WAVE CONTROL AND WITH
PULSE-WIDTH MODULATION AND
ELECTRICAL ASSEMBLY

The invention relates to a rotary electric machine adapted to be controlled with a full-wave type control strategy and a pulse-width modulation control strategy. The invention also relates to an electrical assembly comprising such a rotary electric machine and an inverter.

Patent application FR3086118A1 discloses a rotary electric machine having an axis of rotation and comprising:
  a stator comprising:
    a stator body, in particular a first stack of magnetic laminations, comprising teeth whose radially inner end is free, slots being delimited by two successive teeth, each tooth comprising a first tooth root extending circumferentially in a first direction and a second tooth root extending circumferentially in a second direction opposite the first direction,
    a winding comprising conductors passing through the slots,
  a rotor, inscribed in a cylinder of revolution having for axis the axis of rotation and having an external radius, and comprising:
    a rotor body, in particular a second stack of magnetic laminations, comprising cavities,
    permanent magnets arranged inside the cavities so as to form a succession of north magnetic poles and south magnetic poles, each north magnetic pole and south magnetic pole having a central axis where the absolute value of the first harmonic of the magnetic field is the highest, a quadrature axis being equidistant from two successive central axes.

This type of rotary electric machine can be powered by an inverter supplying the winding with a pulse-width modulation (PWM) type strategy at low rotational speed and a full-wave type strategy at high rotational speed. This type of power supply makes it possible to reduce energy losses in the inverter. However, at low load, the full-wave strategy increases energy losses in the rotary electric machine. The efficiency of the electrical assembly is then reduced, increasing the electrical consumption when the electrical assembly is used in motor mode and reducing the energy generated when the electrical assembly is used in generator mode.

The present invention seeks to overcome all or some of these drawbacks.

The invention relates to a rotary electric machine having an axis of rotation comprising:
  a stator comprising:
    a stator body, in particular a first stack of magnetic laminations, comprising teeth whose radially inner end is free, slots being delimited by two successive teeth, each tooth comprising a first tooth root extending circumferentially in a first direction and a second tooth root extending circumferentially in a second direction opposite the first direction,
    a winding comprising conductors passing through the slots,
  a rotor comprising:
    a rotor body, in particular a second stack of magnetic laminations, comprising cavities,
    permanent magnets arranged inside the cavities so as to form a succession of north magnetic poles and south magnetic poles, each north magnetic pole and south magnetic pole having a central axis and a quadrature axis equidistant from two successive central axes, the central axes and the quadrature axes passing through the axis of rotation,
wherein, in a plane perpendicular to the axis of rotation:
  a first distance is a width of a slot defined radially at the radially innermost conductor passing through the slot,
  a second distance is the distance between a first end of one of the first tooth roots and a second end of one of the second tooth roots, the first end of one of the first roots and the second end of one of the second tooth roots facing each other and belonging to two successive teeth,
  a third distance is the minimum distance, measured radially on the central axis of one of the north magnetic poles and south magnetic poles, between a first magnetic material of the stator body, in particular the first stack of magnetic laminations, and a first magnetic material of the rotor, in particular the second stack of magnetic laminations or one of the permanent magnets,
  a fourth distance is the minimum distance, measured on the quadrature axis, between a second magnetic material of the stator body, in particular the first stack of magnetic laminations, and a second magnetic material of the rotor, in particular the second stack of magnetic laminations or one of the permanent magnets,
  a first ratio between:
    the difference between the first distance and the second distance, and
    the first distance
  being greater than or equal to 0.40, in particular greater than or equal to 0.48, and less than or equal to 0.7, and
  a second ratio between the fourth distance and the third distance being greater than or equal to 0.8 and less than or equal to 1.5.

By using such values for the first ratio and the second ratio, shapes of magnetic rotor poles associated with a size of a stator slot are obtained which allow an overall improvement in the efficiency of an assembly comprising the rotary electric machine and an inverter associated with it. In order to have a good efficiency of the inverter, the winding of the stator is supplied with a strategy of the pulse-width modulation type at low rotational speed and a strategy of the full-wave type at high rotational speed. The use of a first ratio greater than or equal to 0.40, in particular greater than or equal to 0.48, and less than or equal to 0.7, and of a second ratio greater than or equal to 0.8 and less than or equal to 1.5 makes it possible to reduce energy losses in the rotary electric machine at low load and when the full-wave strategy is used without degrading the maximum power of the electrical assembly. The overall efficiency of the electrical assembly is then increased. The electrical consumption when the electrical assembly is used in motor mode is reduced and the energy generated when the electrical assembly is used in generator mode is increased.

According to an additional feature of the invention, the cavities are closed in a plane perpendicular to the axis of rotation A so that the permanent magnets are buried. The use of buried magnets makes it possible to improve holding of the magnets in the rotor body under centrifugation. Such a feature also makes it possible to limit the demagnetization of the permanent magnets.

According to an additional feature of the invention, the permanent magnets have radial magnetization.

The use of magnets arranged so that they have radial magnetization with respect to the axis of rotation allows a simple rotor structure in which the magnetic poles of the rotor are, for example, formed by means of a single magnet.

According to an additional feature of the invention, for each of the magnetic poles of the rotor, a first cavity and a second cavity each receiving at least one permanent magnet define, in a plane perpendicular to the axis of rotation, a V shape, the top of the V being oriented radially outward, the poles of the permanent magnets oriented toward the top of the V being identical and defining a polarity of said magnetic pole of the rotor.

The use of a V-shaped structure makes it possible to improve the mechanical torque of the rotary electric machine. Such a structure also allows an improvement in the specific power of the rotary electric machine.

According to an additional feature of the invention, the first cavity and the second cavity meet at the tip of the V.

Such a feature makes it possible to bring the magnets closer together at the tip of the V. It is thus possible to increase the volume of magnets in the rotor and therefore to increase the power of the machine or to use less powerful magnets without reducing the power of the rotary electric machine.

According to an additional feature of the invention, the cavities are formed so that the permanent magnets have orthoradial magnetization, the orientation of the poles of two successive permanent magnets alternating so that the poles facing each other of two successive magnets are north poles or south poles so as to respectively form a north magnetic pole or a south magnetic pole of the rotor.

Such an arrangement of the permanent magnets allows the use of a large volume of permanent magnets. Such a volume of permanent magnets makes it possible to obtain good performance, in particular with permanent magnets of the ferrite type.

According to an additional feature of the invention, the number of slots of the stator per magnetic pole of the rotor is greater than or equal to 1.

According to an additional feature of the invention, the winding comprises a plurality of phases and the number of slots per phase is greater than or equal to 1.

According to an additional feature of the invention, the winding is three-phase or double three-phase.

According to an additional feature of the invention, a fifth distance H3 being the maximum width of one of the slots, the second distance H2 is less than the fifth distance H3.

According to an additional feature of the invention, the maximum power of the rotary electric machine is between 10 and 35 kW.

According to an additional feature of the invention, the stator body is inscribed in a cylinder whose diameter is greater than or equal to 90 mm and less than or equal to 250 mm.

The invention also relates to an electrical assembly comprising a rotary electric machine as described previously and an inverter supplying the winding and allowing full-wave type control and pulse-width modulation control.

The use of such an inverter makes it possible to improve the efficiency of the inverter over the entire range of rotational speeds of the rotary electric machine. A pulse-width modulation type control can be used at low rotational speed and a full-wave type strategy can be used at high rotational speed.

According to an additional feature of the invention, the inverter is supplied or supplies a source of electrical energy having a voltage of between 24V and 60V.

In all of the above, the rotor may comprise any number of pairs of poles, for example six or eight pairs of poles.

In all of the above, the rotary electric machine may have a stator having a polyphase electric winding, for example formed of wires or of conducting bars connected to one another.

The rotary electric machine may comprise a power electronics component that is able to be connected to the on-board network of a vehicle. This power electronics component comprises for example an inverter/rectifier that allows an on-board network of the vehicle to be charged, or that can be electrically powered by this network, depending on whether the rotary electric machine is operating as a motor or as a generator.

The rotary electric machine may further comprise a pulley or any other means of connection to the rest of a powertrain of the vehicle. The rotary electric machine is, for example, connected, in particular via a belt, to the crankshaft of a combustion engine of the vehicle. In a variant, the rotary electric machine is connected at other locations in the powertrain, for example at the input of a gearbox with regard to the torque passing toward the wheels of the vehicle, at the output of the gearbox with regard to the torque passing toward the wheels of the vehicle, at the gearbox with regard to the torque passing toward the wheels of the vehicle, or on the front axle assembly or the rear axle assembly of this powertrain.

The invention may be understood better upon reading the following description of nonlimiting implementation examples thereof and upon studying the appended drawing, in which.

Throughout the figures, elements that are identical or perform the same function bear the same reference numbers. The following embodiments are examples. Although the description refers to one or more embodiments, this does not necessarily mean that each reference relates to the same embodiment, or that the features apply only to one embodiment. Individual features of various embodiments can also be combined or interchanged in order to create other embodiments.

Figure 1:
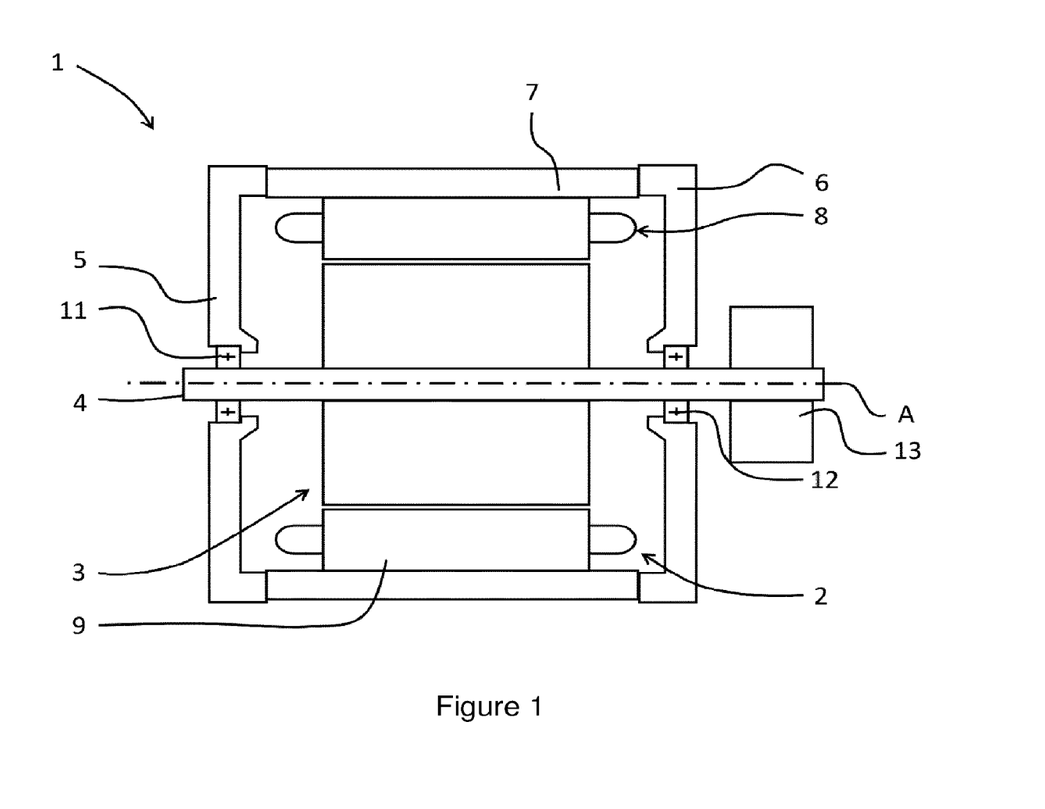
FIG. 1 depicts a schematic partial view in section of a rotary electric machine.

FIG. 1 shows a schematic partial view in section of a rotary electric machine 1 having an axis of rotation A according to a first embodiment of the invention. The rotary electric machine 1 comprises a stator 2 and a rotor 3 in a casing. The casing comprises, for example, a first bearing carrier 5, a second bearing carrier 6 and a tubular spacer 7. The tubular spacer 7 is for example clamped between the first bearing carrier 5 and the second bearing carrier 6, for example by virtue of tie rods (not shown) between the first bearing carrier 5 and the second bearing carrier 6. The stator is fastened inside the casing 32, for example tightly fitted into the tubular spacer 7. Within the meaning of the invention, unless specified otherwise, the terms radial and radially are to be understood with respect to the axis of rotation A. Within the meaning of the invention, unless specified otherwise, the terms longitudinal and longitudinally mean in the direction of the axis of rotation A.

In an embodiment of the invention that is not shown, the tubular spacer comprises a cooling chamber in which a liquid coolant circulates.

In an embodiment of the invention that is not shown, there is no tubular spacer and the stator is clamped between the first bearing carrier and the second bearing carrier.

The stator comprises a stator body 9 and a winding 8. The stator body 9 comprises for example a first stack of magnetic laminations. For example, the winding 8 comprises electrical conductors of which an active part passes through slots formed in the stator body 9 and a connecting part or winding overhang is formed outside of the slots. The winding 8 is for example a winding of the hairpin-winding type.

The rotor 3 is for example fixed on a shaft 4 with axis of rotation A. The shaft 4 is guided in rotation by a first rolling bearing 11 mounted in the first bearing carrier 5 and a second rolling bearing 12 mounted in the second bearing carrier 6. A drive element 13, for example a pulley or a gear, is fastened to the shaft 4.

In another embodiment that is not shown, the shaft 4 is guided in rotation with respect to the first bearing carrier and to the second bearing carrier by virtue of other known rotation-guiding means, for example plain journal bearings.

Figure 2:
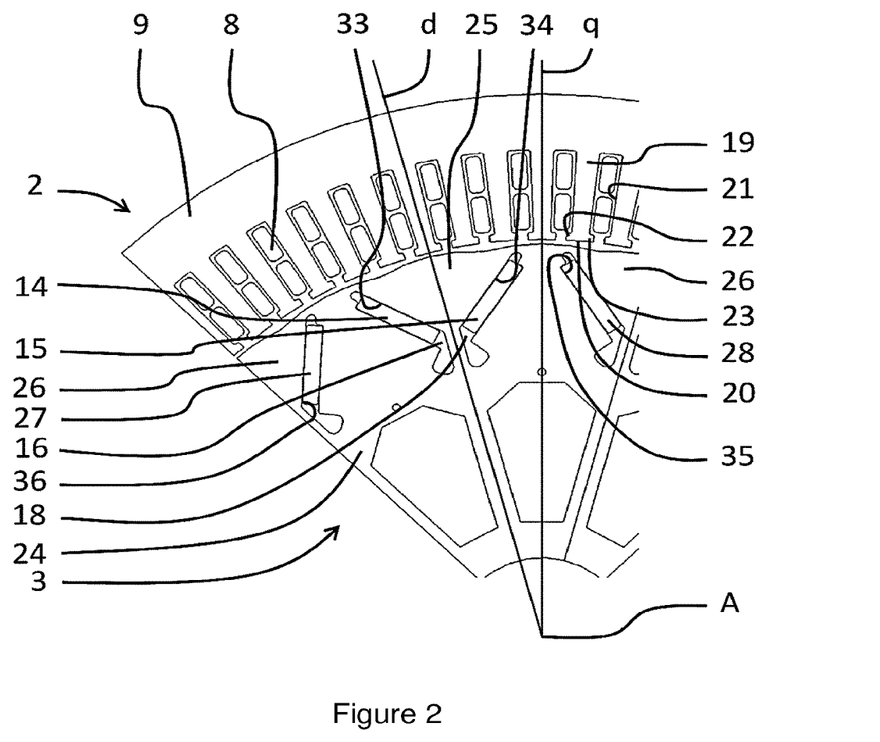
FIG. 2 depicts a schematic partial view in section of a rotary electric machine according to a first embodiment of the invention.

FIG. 2 shows a view in section in a plane perpendicular to the axis of rotation A of the stator 2 and of the rotor 3 of a rotary electric machine according to a first embodiment.

The stator body 9 comprises teeth 19 whose radially inner end 20 is free. Slots 21 are delimited by two successive teeth 19. Each tooth 19 comprises a first tooth root 22 extending circumferentially in a first direction and a second tooth root 23 extending circumferentially in a second direction opposite the first direction.

The conductors of the winding 8 are, for example, housed between a bottom of the slot, radially outside the slot 21, and the first tooth root 22 and/or the second tooth root 23.

The rotor 3 is inscribed in a cylinder of revolution having for axis the axis of rotation A and having an external radius L.

The rotor 3 comprises a rotor body 24 and permanent magnets 14, 15, 27, 28. The rotor body 24 comprises, for example, a second stack of magnetic laminations. The rotor body 24 comprises cavities 21 in which the permanent magnets 14, 15, 27, 28 are arranged so as to form a succession of north magnetic poles 25 and south magnetic poles 26. The cavities 21 are, for example, longitudinal cavities.

Each north magnetic pole 25 and south magnetic pole 26 has a central axis d passing through the axis of rotation A. The central axis d passes through the point on the magnetic pole where the absolute value of the first harmonic of a magnetic field is the highest. The absolute value of the first harmonic of the magnetic field is measured on the external radius L while rotating around the rotor 3 with respect to the axis of rotation A, the rotor 3 being immobile and the winding 8 of the stator 2 not being electrically supplied. It is understood that the harmonic is considered here with respect to an angle around the axis of rotation A. A quadrature axis q passing through the axis of rotation A is equidistant from two successive central axes.

The cavities 21 can be closed in a plane perpendicular to the axis of rotation A so that the permanent magnets are buried as in the first embodiment.

For each of the magnetic poles 25, 26 of the rotor 3, a first cavity 33, 35 and a second cavity 34, 36 each receive for example at least one permanent magnet 14, 15, 27, 28. The first cavity 33, 35 and the second cavity 34, 36 define, in a plane orthogonal to the axis of rotation A, a V shape. The first cavity 33 and the second cavity 34 are, for example, longitudinal. The top of the V is oriented radially outward. The poles of the permanent magnets oriented toward the top of the V are identical and define a polarity of said magnetic pole of the rotor. The first cavity 33, 35 and the second cavity 34, 36 can be separated at the tip of the V, for example by a strip of material of the rotor body 24.

In another embodiment of the invention that is not shown, the first cavity and the second cavity meet at the tip of the V. The first cavity and second cavity then form a single V-shaped cavity. In another embodiment of the invention that is not shown, the first cavity and the second cavity receiving the magnets are separated radially on the inside by a third cavity also receiving a magnet. The orientation of the third cavity is, for example, perpendicular to a radius of the rotor. The radially outwardly oriented pole of the permanent magnet received in the third cavity is the same as the radially outwardly oriented pole of the permanent magnets received in the first cavity and the second cavity. The first cavity, the second cavity and the third cavity define a U shape.

In a variant (not shown) of this other embodiment of the invention, the first cavity, the second cavity and the third cavity meet so as to form a single U-shaped cavity. In a variant, the magnets received in this single cavity join to form a single U-shaped magnet.

The number of slots of the stator per magnetic pole is, for example, greater than or equal to 1. In the embodiments of the invention shown in the figures, the number of slots of the stator per magnetic pole is 6.

The winding 8 comprises, for example, a plurality of phases and the number of slots per phase is greater than or equal to one.

The winding 8 of the rotary electric machine 1 is, for example, three-phase or double three-phase.

An electrical assembly may comprise the rotary electric machine 1 and an inverter (not shown). The inverter supplies the winding 8. The inverter allows, for example, two different types of control of the rotary electric machine: a full-wave type control and a pulse-width modulation control.

For example, the inverter is supplied or supplies a source of electrical energy, in particular an electric battery, having a voltage of between 24V and 60V.

Figure 3:
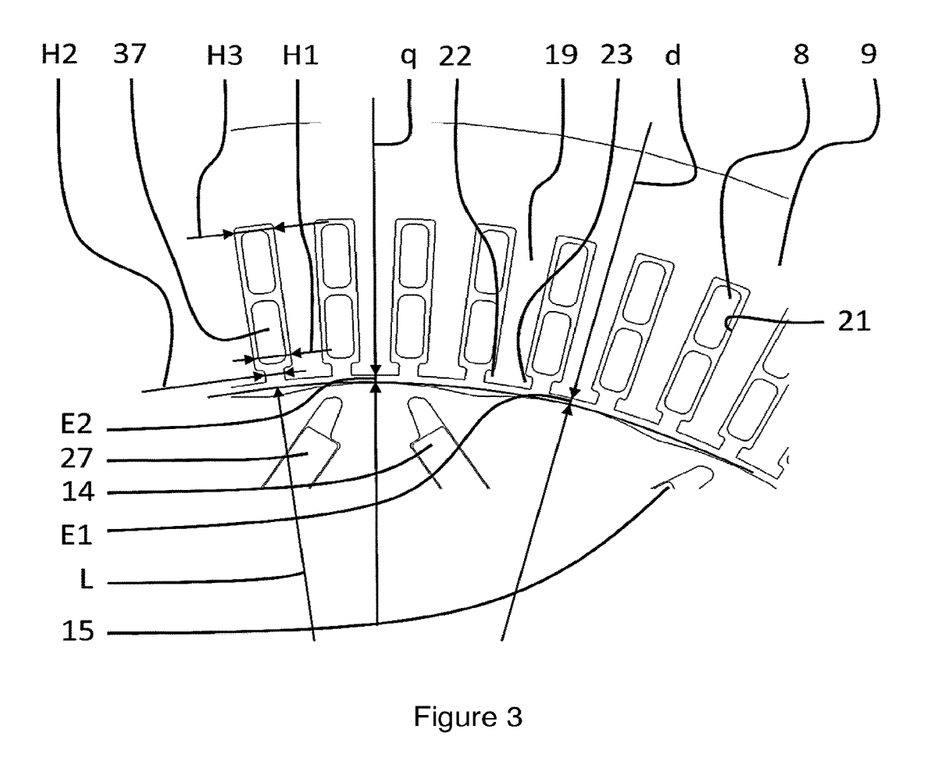
FIG. 3 depicts a schematic partial view of a detail of FIG. 2.

FIG. 3 shows a detail of the first embodiment of the invention of FIG. 2.

A first distance H1 is a width of one of the slots 21 in a plane perpendicular to the axis of rotation A. The first distance H1 is defined radially at the radially innermost conductor 37 passing through the slot. The first distance H1 is, for example, the smallest distance measured radially at a widest region of the cross section of the radially innermost conductor 37.

For example, in the embodiments shown in the figures, the conductors have a rectangular cross section and the slots 21 have a trapezoidal cross section in a plane perpendicular to the axis of rotation A. The width of the slots is wider in a region radially to the outside of the slots than in a region radially to the inside of the slots 21. The first distance H1 is therefore measured at the radially inner level, excluding rounding, of the radially innermost conductor 37.

In another embodiment of the invention that is not shown, the conductors have a round cross section. The first distance is therefore measured radially at the center of the round cross section. A second distance H2 is the distance, measured in a plane perpendicular to the axis of rotation A, between a first end of one of the first tooth roots 22 and a second end of one of the second tooth roots 23, the first end of one of the first roots 22 and the second end of one of the second tooth roots 23 facing each other and belonging to two successive teeth.

A first ratio C1 between:
the difference between the first distance H1 and the second distance H2, and
the first distance H1
is greater than or equal to 0.40, in particular greater than or equal to 0.48, and less than or equal to 0.7.

A third distance E1 is the minimum distance, measured radially on the central axis d of one of the north magnetic poles 25 and south magnetic poles 26, between a first magnetic material of the stator body 9 and a first magnetic material of the rotor 3. The first magnetic material of the stator body 9 is, for example, the first stack of magnetic laminations. The first magnetic material of the rotor 3 is, for example, the second stack of magnetic laminations or one of the permanent magnets. In the first embodiment of the invention of FIG. 2 and FIG. 3, the first magnetic material of the rotor 3 is the second stack of magnetic laminations.

A fourth distance E2 is the minimum distance, measured on the quadrature axis q, between a second magnetic material of the stator body 9 and a second magnetic material of the rotor 3. The second magnetic material of the stator body 9 is, for example, the first stack of magnetic laminations. The second magnetic material of the rotor 3 is, for example, the second stack of magnetic laminations or one of the permanent magnets. In the first embodiment of the invention of FIG. 2 and FIG. 3, the second magnetic material of the rotor 3 is the second stack of magnetic laminations.

A second ratio C2 between the fourth distance E2 and the third distance E1 is greater than or equal to 0.8 and less than or equal to 1.5.

A fifth distance H3 is the maximum width of one of the slots. The second distance H2 is, for example, less than the fifth distance H3.

Figure 4:
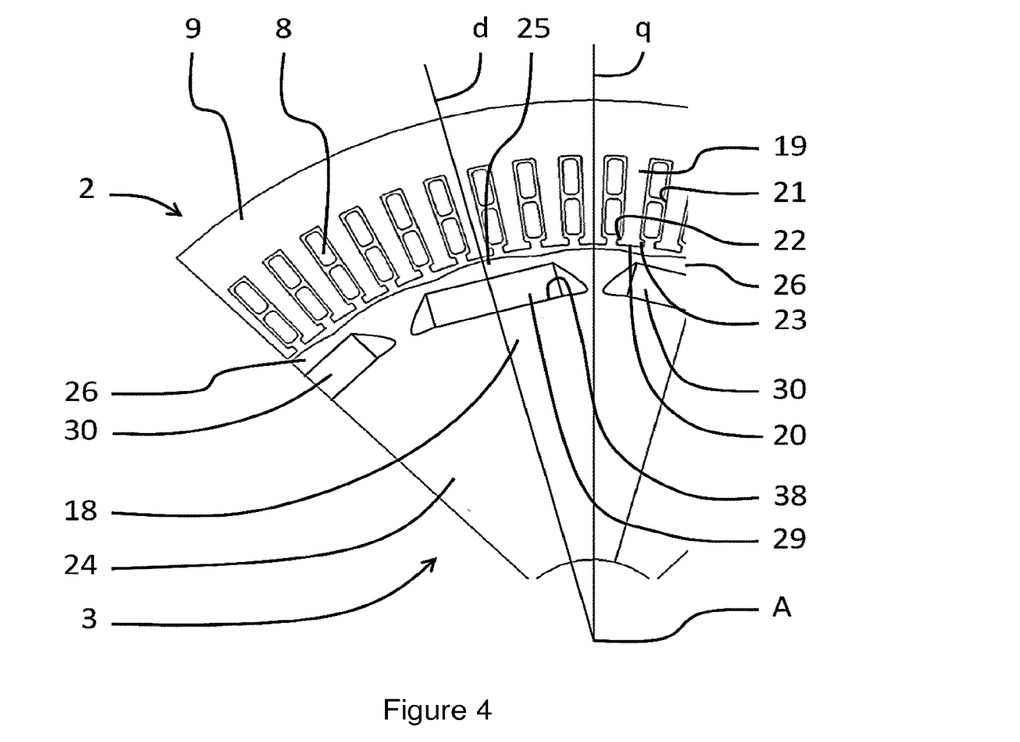
FIG. 4 depicts a schematic partial view in section of a rotary electric machine according to a second embodiment of the invention.

FIG. 4 shows a view in section, in a plane perpendicular to the axis of rotation A, of the stator 2 and of the rotor 3 of a rotary electric machine according to a second embodiment.

The second embodiment is similar to the first embodiment. However, the arrangement of the permanent magnets 29, 30 in the body of the rotor 24 is different. Cavities 38, for example longitudinal cavities, are formed in the rotor body 24 so as to receive the permanent magnets 29, 30. The permanent magnets have radial magnetization, that is to say that one of the north pole and south pole of the permanent magnet is oriented radially outward and the other of the north pole and south pole is oriented radially inward. Permanent magnets 29 whose pole oriented radially outward is a north pole and permanent magnets 30 whose pole oriented radially outward is a south pole alternate circumferentially. Thus a succession of north magnetic poles 25 and south magnetic poles 26 is formed on the rotor 3.

The permanent magnets 29, 30 have, for example, the shape of a rectangular parallelepiped extending longitudinally in the cavities 38.

In another embodiment (not shown) of the invention, the permanent magnets comprise a plurality of elementary permanent magnets.

In the second embodiment, the cavities 38 can be closed in a plane perpendicular to the axis of rotation A so that the permanent magnets are buried.

In the second embodiment of the invention, the first magnetic material of the rotor 3 used to define the third distance E1 is, as in the first embodiment of the invention, the second stack of magnetic laminations. Similarly, the second magnetic material of the rotor used to define the fourth distance E2 is, as in the first embodiment of the invention, the second stack of magnetic laminations.

Figure 5:
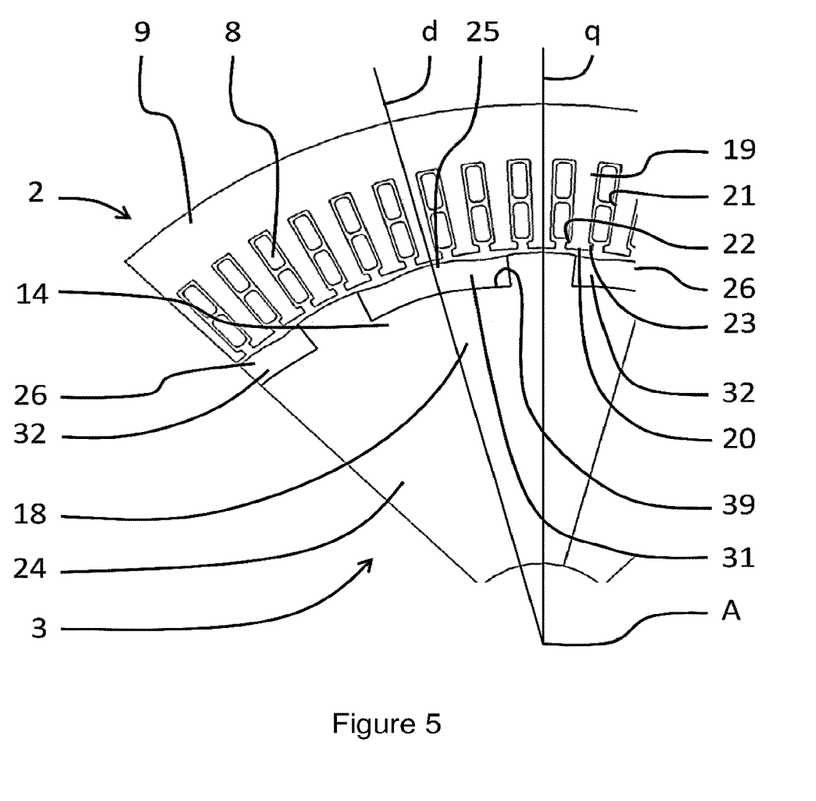
FIG. 5 depicts a schematic partial view in section of a rotary electric machine according to a third embodiment of the invention.

FIG. 5 show a view in section, in a plane perpendicular to the axis of rotation A, of the stator 2 and of the rotor 3 of a rotary electric machine according to a third embodiment.

The third embodiment is similar to the second embodiment. However, the arrangement of the permanent magnets 31, 32 in the rotor body 24 is different.

In the third embodiment of the invention, the permanent magnets 31, 32 are arranged on the surface of the outer surface of the rotor body 24. The rotor body 24 comprises cavities 39 open radially outward and receiving the permanent magnets 31, 32.

In a variant (not shown) of the third embodiment, the rotor comprises an outer casing made of a nonmagnetic material, in particular an aluminum alloy or plastics material. The casing participates, for example, in the radial retention of the magnets on the rotor body.

In the third embodiment and its variant, the first magnetic material of the rotor 3 used to define the third distance E1 is the permanent magnet 31, 32. The second magnetic material of the rotor used to define the fourth distance E2 is, as in the second embodiment of the invention, the second stack of magnetic laminations.

In another embodiment of the invention that is not shown, the cavities are formed so that the permanent magnets have orthoradial magnetization. The orientation of the poles of two successive permanent magnets alternates so that the poles facing one another of two successive magnets are north poles or south poles so as to respectively form a north magnetic pole or a south magnetic pole of the rotor.

The invention claimed is:

1. A rotary electric machine having an axis of rotation comprising:
    a stator comprising:
        a stator body including a first stack of magnetic laminations comprising teeth whose radially inner end is free, and slots being delimited by two successive teeth, each tooth comprising a first tooth root extending circumferentially in a first direction and a second tooth root extending circumferentially in a second direction opposite the first direction, and
        a winding comprising conductors passing through the slots, and a rotor comprising:
        a rotor body including a second stack of magnetic laminations comprising cavities, and
        permanent magnets arranged inside the cavities so as to form a succession of north magnetic poles and south magnetic poles, each north magnetic pole and south magnetic pole having a central axis and a quadrature axis equidistant from two successive central axes, the central axes and the quadrature axes passing through the axis of rotation,
    wherein, in a plane perpendicular to the axis of rotation:
        a first distance is a width of a slot defined radially at a radially innermost conductor passing through the slot,
        a second distance is a distance between a first end of one of the first tooth roots and a second end of one of the second tooth roots, the first end of one of the first roots and the second end of one of the second tooth roots facing each other and belonging to two successive teeth,
        a third distance is a minimum distance, measured radially on the central axis of one of the north magnetic poles and south magnetic poles, between a first magnetic material of the stator body being the first stack of magnetic laminations, and a first magnetic material of the rotor being the second stack of magnetic laminations or one of the permanent magnets, and a fourth distance is a minimum distance, measured on the quadrature axis, between a second magnetic material of the stator body being the first stack of magnetic laminations, and a second magnetic material of the rotor being the second stack of magnetic laminations or one of the permanent magnets, a first ratio between a difference between the first distance and the second distance, and the first distance, being greater than or equal to 0.40, and less than or equal to 0.7, and a second ratio between the fourth distance and the third distance being greater than or equal to 0.8 and less than or equal to 1.5.

2. The rotary electric machine as claimed in claim 1, wherein the cavities are closed in a plane perpendicular to the axis of rotation so that the permanent magnets are buried.

3. The rotary electric machine as claimed in claim 2, wherein the permanent magnets have radial magnetization.

4. The rotary electric machine as claimed in claim 2, wherein, for each of the magnetic poles of the rotor, a first cavity and a second cavity each receiving at least one permanent magnet define, in a plane perpendicular to the axis of rotation, a V shape, top of the V being oriented radially outward, the poles of the permanent magnets oriented toward the top of the V being identical and defining a polarity of said magnetic pole of the rotor.

5. The rotary electrical machine as claimed in claim 2, wherein a number of slots of the stator per magnetic pole of the rotor is greater than or equal to 1.

6. The rotary electrical machine as claimed in claim 2, wherein the winding comprises a plurality of phases and a number of slots per phase is greater than or equal to 1.

7. The rotary electric machine as claimed in claim 2, wherein the winding is three-phase or double three-phase.

8. The rotary electric machine as claimed in claim 2, wherein, a fifth distance being a maximum width of one of the slots, the second distance is less than the fifth distance.

9. An electrical assembly comprising a rotary electric machine as claimed in claim 2 and an inverter supplying the winding and allowing full-wave type control and pulse-width modulation control.

10. The rotary electric machine as claimed in claim 1, wherein the permanent magnets have radial magnetization.

11. The rotary electrical machine as claimed in claim 10, wherein a number of slots of the stator per magnetic pole of the rotor is greater than or equal to 1.

12. The rotary electrical machine as claimed in claim 10, wherein the winding comprises a plurality of phases and a number of slots per phase is greater than or equal to 1.

13. The rotary electric machine as claimed in claim 1, wherein, for each of the magnetic poles of the rotor, a first cavity and a second cavity each receiving at least one permanent magnet define, in a plane perpendicular to the axis of rotation, a V shape, a top of the V being oriented radially outward, the poles of the permanent magnets oriented toward the top of the V being identical and defining a polarity of said magnetic pole of the rotor.

14. The rotary electrical machine as claimed in claim 13, wherein the first cavity and the second cavity meet at a tip of the V.

15. The rotary electrical machine as claimed in claim 1, wherein a number of slots of the stator per magnetic pole of the rotor is greater than or equal to 1.

16. The rotary electrical machine as claimed in claim 1, wherein the winding comprises a plurality of phases and a number of slots per phase is greater than or equal to 1.

17. The rotary electric machine as claimed in claim 1, wherein the winding is three-phase or double three-phase.

18. The rotary electric machine as claimed in claim 1, wherein, a fifth distance being a maximum width of one of the slots, the second distance is less than the fifth distance.

19. An electrical assembly comprising a rotary electric machine as claimed in claim 1 and an inverter supplying the winding and allowing full-wave type control and pulse-width modulation control.

20. The electrical assembly as claimed in claim 19, wherein the inverter is supplied or supplies a source of electrical energy having a voltage of between 24V and 60V.

* * * * *